United States Patent
Hassan et al.

(10) Patent No.: US 9,681,367 B2
(45) Date of Patent: Jun. 13, 2017

(54) WHITE SPACE UTILIZATION

(71) Applicant: Microsoft Technology Licensing, LLC, Redmond, WA (US)

(72) Inventors: Amer A. Hassan, Kirkland, WA (US); Paul W. Garnett, Albany, NY (US); Paul W. A. Mitchell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/951,426

(22) Filed: Nov. 24, 2015

(65) Prior Publication Data
US 2016/0081014 A1 Mar. 17, 2016

Related U.S. Application Data

(63) Continuation of application No. 13/773,660, filed on Feb. 22, 2013.

(51) Int. Cl.
| | |
|---|---|
| H04W 72/04 | (2009.01) |
| H04W 72/08 | (2009.01) |
| H04W 64/00 | (2009.01) |
| H04W 48/16 | (2009.01) |
| H04W 16/14 | (2009.01) |

(52) U.S. Cl.
CPC .......... *H04W 48/16* (2013.01); *H04W 16/14* (2013.01); *H04W 72/0453* (2013.01); *H04W 72/085* (2013.01); *H04W 64/003* (2013.01)

(58) Field of Classification Search
CPC ... H04W 16/14; H04W 72/082; H04W 24/08; H04W 72/0406

USPC ......................................................... 455/453
See application file for complete search history.

(56) References Cited

U.S. PATENT DOCUMENTS

| | | | |
|---|---|---|---|
| 6,304,756 | B1 | 10/2001 | Hebeler et al. |
| 6,567,665 | B1 | 5/2003 | Kissee |
| 7,013,158 | B1 | 3/2006 | Cook |
| 7,876,786 | B2 | 1/2011 | Bahl et al. |
| 8,185,120 | B2 | 5/2012 | Hassan et al. |
| 8,311,548 | B2 | 11/2012 | Zumsteg et al. |
| 8,437,790 | B1 | 5/2013 | Hassan et al. |
| 8,467,359 | B2 | 6/2013 | McCann et al. |
| 8,483,155 | B1 | 7/2013 | Banerjea et al. |
| 8,507,293 | B2 | 8/2013 | Ward et al. |

(Continued)

FOREIGN PATENT DOCUMENTS

| | | |
|---|---|---|
| CN | 1887023 A | 12/2006 |
| EP | 1740001 A1 | 3/2007 |

(Continued)

OTHER PUBLICATIONS

Response filed May 3, 2016 to Final Office Action mailed Mar. 11, 2016 from U.S. Appl. No. 13/564,727, 12 pages.

(Continued)

*Primary Examiner* — Marisol Figueroa
(74) *Attorney, Agent, or Firm* — Rainier Patents, P.S.

(57) ABSTRACT

The concepts relate to radio white space utilization. One example can obtain information about a location of a device. The example can access a white space database to obtain radio white space frequencies relative to the location. This example can also perform active scanning of at least some of the radio white space frequencies at the location and not perform active scanning on allocated frequencies.

20 Claims, 8 Drawing Sheets

(56) References Cited

U.S. PATENT DOCUMENTS

| | | | |
|---|---|---|---|
| 8,509,695 B2 | 8/2013 | King et al. | |
| 8,588,158 B2* | 11/2013 | Kim | H04W 72/0426 370/329 |
| 8,605,741 B2 | 12/2013 | Kim et al. | |
| 8,767,763 B2 | 7/2014 | Kim et al. | |
| 9,014,738 B2* | 4/2015 | Gebert | H04W 76/02 455/450 |
| 9,025,536 B2* | 5/2015 | Krishnaswamy | H04W 72/085 370/329 |
| 9,094,834 B2 | 7/2015 | Hassan et al. | |
| 2001/0048746 A1 | 12/2001 | Dooley | |
| 2002/0036989 A1 | 3/2002 | Payton | |
| 2002/0107709 A1 | 8/2002 | Colson et al. | |
| 2002/0107811 A1 | 8/2002 | Jain et al. | |
| 2004/0043772 A1 | 3/2004 | Quirke | |
| 2004/0248585 A1 | 12/2004 | Karacaoglu | |
| 2004/0259546 A1 | 12/2004 | Balachandran et al. | |
| 2007/0275730 A1 | 11/2007 | Bienas et al. | |
| 2008/0036647 A1 | 2/2008 | Jung | |
| 2008/0113787 A1 | 5/2008 | Alderucci et al. | |
| 2008/0130519 A1 | 6/2008 | Bahl et al. | |
| 2009/0061892 A1 | 3/2009 | Lee et al. | |
| 2009/0083800 A1 | 3/2009 | Puthalapat et al. | |
| 2009/0144791 A1 | 6/2009 | Huffman et al. | |
| 2009/0181621 A1 | 7/2009 | Kimura | |
| 2009/0196180 A1 | 8/2009 | Bahl et al. | |
| 2009/0243796 A1 | 10/2009 | Tieman | |
| 2009/0247201 A1 | 10/2009 | Ye et al. | |
| 2010/0048234 A1 | 2/2010 | Singh | |
| 2010/0136994 A1 | 6/2010 | Kim et al. | |
| 2010/0246506 A1 | 9/2010 | Krishnaswamy | |
| 2010/0309806 A1 | 12/2010 | Wu et al. | |
| 2010/0328139 A1 | 12/2010 | Iwasaki et al. | |
| 2011/0014936 A1 | 1/2011 | Kim | |
| 2011/0039495 A1 | 2/2011 | Sawai et al. | |
| 2011/0059701 A1 | 3/2011 | Fujii et al. | |
| 2011/0076959 A1 | 3/2011 | Selen et al. | |
| 2011/0080882 A1 | 4/2011 | Shu et al. | |
| 2011/0090887 A1 | 4/2011 | Kim et al. | |
| 2011/0096770 A1 | 4/2011 | Henry | |
| 2011/0164186 A1 | 7/2011 | Sadek et al. | |
| 2011/0164580 A1 | 7/2011 | Keon | |
| 2011/0182257 A1 | 7/2011 | Raveendran et al. | |
| 2011/0205910 A1* | 8/2011 | Soomro | H04W 80/04 370/252 |
| 2011/0223877 A1 | 9/2011 | Tillman et al. | |
| 2011/0223931 A1 | 9/2011 | Buer et al. | |
| 2011/0228666 A1 | 9/2011 | Barbieri et al. | |
| 2011/0237238 A1 | 9/2011 | Hassan et al. | |
| 2011/0243078 A1 | 10/2011 | Kim | |
| 2011/0264780 A1 | 10/2011 | Reunamaki et al. | |
| 2011/0287802 A1 | 11/2011 | Ma et al. | |
| 2011/0299481 A1 | 12/2011 | Kim et al. | |
| 2011/0299509 A1 | 12/2011 | Wang et al. | |
| 2011/0306375 A1 | 12/2011 | Chandra et al. | |
| 2011/0307612 A1 | 12/2011 | Junell et al. | |
| 2011/0310840 A1 | 12/2011 | Kennedy et al. | |
| 2011/0310865 A1 | 12/2011 | Kennedy et al. | |
| 2011/0319129 A1* | 12/2011 | Bhat | H04W 72/02 455/552.1 |
| 2012/0009874 A1 | 1/2012 | Kiukkonen et al. | |
| 2012/0052891 A1 | 3/2012 | Irnich et al. | |
| 2012/0094681 A1 | 4/2012 | Freda et al. | |
| 2012/0120892 A1 | 5/2012 | Freda et al. | |
| 2012/0122477 A1 | 5/2012 | Sadek et al. | |
| 2012/0148068 A1 | 6/2012 | Chandra et al. | |
| 2012/0163309 A1 | 6/2012 | Ma et al. | |
| 2012/0182883 A1 | 7/2012 | Junell et al. | |
| 2012/0184318 A1 | 7/2012 | Lee et al. | |
| 2012/0195230 A1 | 8/2012 | de Saint Julien et al. | |
| 2012/0230250 A1 | 9/2012 | Kasslin et al. | |
| 2012/0238304 A1 | 9/2012 | Lambert et al. | |
| 2012/0281594 A1 | 11/2012 | Stewart et al. | |
| 2012/0300761 A1 | 11/2012 | Vasko et al. | |
| 2012/0307685 A1 | 12/2012 | Kim et al. | |
| 2013/0039212 A1 | 2/2013 | Li et al. | |
| 2013/0070605 A1 | 3/2013 | Ghosh et al. | |
| 2013/0114480 A1 | 5/2013 | Chapman et al. | |
| 2013/0195096 A1 | 8/2013 | Kim et al. | |
| 2013/0204677 A1 | 8/2013 | Wang | |
| 2013/0223357 A1 | 8/2013 | Jones et al. | |
| 2013/0337741 A1 | 12/2013 | Hassan et al. | |
| 2013/0337857 A1 | 12/2013 | Hassan et al. | |
| 2014/0066059 A1* | 3/2014 | Patil | H04W 48/16 455/434 |
| 2014/0146723 A1 | 5/2014 | Chang | |
| 2014/0242981 A1 | 8/2014 | Hassan et al. | |
| 2014/0274089 A1 | 9/2014 | Hassan et al. | |
| 2014/0274090 A1 | 9/2014 | Mitchell et al. | |
| 2015/0119059 A1 | 4/2015 | Miao et al. | |
| 2015/0282181 A1 | 10/2015 | Hassan et al. | |

FOREIGN PATENT DOCUMENTS

| | | |
|---|---|---|
| EP | 2224771 A1 | 1/2010 |
| GB | 2477916 A | 8/2011 |
| GB | 2492967 A | 1/2013 |
| WO | 2006/117587 A1 | 11/2006 |
| WO | 2010/022156 A2 | 2/2010 |
| WO | 2010/108439 A1 | 9/2010 |
| WO | 2011/053078 A2 | 5/2011 |
| WO | 2011/062722 A1 | 5/2011 |
| WO | 2012/035190 A1 | 3/2012 |
| WO | 2012/087694 A1 | 6/2012 |
| WO | 2012/125631 A1 | 9/2012 |
| WO | WO 2012118490 A1 * | 9/2012 ............ H04W 16/14 |
| WO | 2012/171456 A1 | 12/2012 |
| WO | 2012/174152 A2 | 12/2012 |

OTHER PUBLICATIONS

Response filed Apr. 25, 2016 to Second Office Action mailed Feb. 14, 2016 from China Patent Application No. 201310241494.8, 10 pages.

Non-Final Office Action mailed May 5, 2016 from U.S. Appl. No. 13/828,820, 54 pages.

Marcus, Michael J., "Regulatory and Policy Issues—Unlicensed Cognitive Sharing of TV Spectrum: The Controversy at the Federal Communications Commission," IEEE Communications Magazine, vol. 43 Issue 5, May 2005, pp. 24-25, 2 pages.

Min et al., "Detection of Small-Scale Primary Users in Cognitive Radio Networks", Proceedings of IEEE Journal on Selected Areas in Communications, vol. 29, Issue 2, Feb. 2011, 13 pages.

Na et al., "Policy-based Dynamic Channel Selection Architecture for Cognitive Radio Networks", Proceedings of Second International Conference on Communications and Networking in China, Aug. 22, 2007, 5 pages.

"Outdoor heterogeneous ISM/TVWS VSN testbed", retrieved at <<http://www.crew-project.eu/vsn>> on Feb. 21, 2012, 5 pages.

Sato et al., "TV White Spaces as part of the future Spectrum Landscape for Wireless Communications," ETSI Workshop on Reconfigurable Radio Systems, Dec. 12, 2012, France, 8 pages.

Saeed et al., "TVBDs Coexistence by Leverage Sensing and Geo-location Database", ICCCE 2012, Jul. 3-5, 2012, Malaysia, 7 pages.

Seok, Yongho, (LG Electronics), "CC4 Comment Resolution-Reduced Neighbor Report; 11-13-0024-02-00af-cc4-comment-resolution-reduced-neighbor report," retrieved on Jan. 14, 2013, IEEE SA Mentor; 11-13-0024-02-00AF-CC4-Comment-Resolution-Reduced-Neighbor-Report, IEEE-SA Mentor, Piscataway, NJ, USA, vol. 802.11af, No. 2, Jan. 14, 2013, pp. 1-5, 5 pages.

Shellhammer et al., "Technical Challenges for Cognitive Radio in the TV White Space Spectrum", retrieved at <<http://ita.ucsd.edu/workshop/09/files/paper/paper_1500.pdf>>, Information Theory and Applications Workshop, Feb. 8, 2009, pp. 323-333, 11 pages.

Simic et al., "Wi-Fi, but not on Steroids: Performance Analysis of a Wi-Fi-like Network Operating in TVWS under Realistic Conditions", Proceedings of the IEEE International Conference on Communications, 2012, pp. 1533-1538, 6 pages.

(56) References Cited

OTHER PUBLICATIONS

TV White Spaces: A Global Momentum towards Commercialization:, retrieved at <<http://whitespace.i2r.a-star.edu.sg/TVWS_Workshop/Slides/8%209%2010_Inside%20the%20nerve%20Centre%20-%20COMPLETE%20SESSION.pdf>>, Oct. 10, 2012, 22 pages.
Viola, Catherine, "TV white spaces: a new option for smart grid communications?", published Sep. 27, 2011, retrieved at <<http://www.smartgridopinions.com/article/tv-white-spaces-new-option-smart-grid-communications>> on Feb. 15, 2012, 7 pages.
Wang et al., "Channel Assignment of Cooperative Spectrum Sensing in Multi-Channel Cognitive Radio Networks", retrieved at <<http://ieeexplore.ieee.org/stamp/stamp.jsp?arnumber=05962509>>, Proceedings of IEEE International Conference on Communications (ICC), Jun. 5, 2011, pp. 1-5, 5 pages.
Non-Final Office Action mailed Jun. 27, 2014, from U.S. Appl. No. 13/525,370, 13 pages.
Response filed Oct. 27, 2014 to the Non-Final Office Action mailed Jun. 27, 2014, from U.S. Appl. No. 13/525,370, 12 pages.
Final Office Action mailed Dec. 9, 2014, from U.S. Appl. No. 13/525,370, 15 pages.
Response filed Apr. 7, 2015 to the Final Office Action mailed Dec. 9, 2014 from U.S. Appl. No. 13/525,370, 15 pages.
Notice of Allowance mailed May 4, 2015 from U.S. Appl. No. 13/525,370, 8 pages.
Notice of Allowance mailed Jun. 1, 2015 from U.S. Appl. No. 13/525,370, 4 pages.
Applicant Initiated Interview Summary mailed Jun. 1, 2015 from U.S. Appl. No. 13/525,370, 2 pages.
Notice of Allowance mailed Sep. 18, 2015 from U.S. Appl. No. 13/525,370, 6 pages.
Notice of Allowance mailed Dec. 30, 2015 from U.S. Appl. No. 13/525,370, 10 pages.
Requirement for Election/Restriction mailed Jun. 10, 2014 from U.S. Appl. No. 13/609,271, 6 pages.
Response filed Jun. 25, 2014 to the Requirement for Election/Restriction mailed Jun. 10, 2014 from U.S. Appl. No. 13/609,271, 7 pages.
Non-Final Office Action mailed Jul. 10, 2014 from U.S. Appl. No. 13/609,271, 15 pages.
Response filed Nov. 10, 2014 to the Non-Final Office Action mailed Jul. 10, 2014 from U.S. Appl. No. 13/609,271, 14 pages.
Final Office Action mailed Nov. 25, 2014 from U.S. Appl. No. 13/609,271, 13 pages.
Response filed Feb. 23, 2015 to the Final Office Action mailed Nov. 25, 2014 from U.S. Appl. No. 13/609,271, 9 pages.
Notice of Allowance mailed Mar. 24, 2015 from U.S. Appl. No. 13/609,271, 8 pages.
International Search Report mailed Nov. 18, 2013 from PCT Patent Application No. PCT/US2013/058348, 11 pages.
Preliminary Amendment filed Jun. 26, 2015 from U.S. Appl. No. 14/738,562, 8 pages.
Achtzehn et al., "Deployment of a Cellular Network in the TVWS: A Case Study in a Challenging Environment,", 3rd ACM workshop on Cognitive Radio Networks, Sep. 19, 2011, Las Vegas, Nevada, 6 pages.
Austin, Mark, "Ofcom Digital dividend: cognitive access," OFCOM, vol. 802 Issue No. 18, Feb. 16, 2009, 63 pages.
Bogucka et al., "Secondary Spectrum Trading in TV White Spaces", IEEE Communications Magazine, Nov. 2012, pp. 121-129, 9 pages.
"Dynamic Spectrum Management" (Interdigital), Oct. 2012, 14 pages.
Fatemieh et al., "Using Classification to Protect the Integrity of Spectrum Measurements in White Space Networks", Proceedings of the 18th Annual Network and Distributed System Security Symposium, Feb. 2011, 17 pages.
Fazeli-Dehkordy et al., "Wide-Band Collaborative Spectrum Search Strategy for Cognitive Radio Networks", Proceedings of IEEE Transactions on Signal Processing, vol. 59, No. 8, Aug. 2011, pp. 3903-3914, 12 pages.
Feng et al., "Database-Assisted Mutli-AP Network on TV White Spaces: Architecture, Spectrum Allocation and AP Discovery", 12 pages.
Ghosh et al., "Coexistence Challenges for Heterogeneous Cognitive Wireless Networks in TV White Spaces", IEEE Wireless Communications, Aug. 2011, pp. 22-31, 10 pages.
Gurney et al., "Geo-location Database Techiques for Incumbent Protection in the TV White Space", IEEE, 2008, 9 pages.
Kertulla et al., "Dimensioning of secondary cellular system in TVWS," Proceedings of the Seventh International Conference on Cognitive Radio Oriented Wireless Networks and Communications, Jun. 18-20, 2012, pp. 190-195, 6 pages.
Kokkinene, Heikki, "Propagating thoughts", published Jun. 4, 2012, retrieved at <<http://www.fairspectrum.com/propagating-thoughts>> on Jul. 19, 2012, 7 pages.
Restriction Requirement mailed Jun. 24, 2016 from U.S. Appl. No. 14/738,562, 6 pages.
Non-Final Office Action mailed Mar. 3, 2015 from U.S. Appl. No. 13/828,820, 18 pages.
Response filed Jun. 19, 2015 to the Non-Final Office Action mailed Mar. 3, 2015 from U.S. Appl. No. 13/828,820, 10 pages.
Final Office Action mailed Aug. 24, 2015 from U.S. Appl. No. 13/828,820, 24 pages.
Response filed Dec. 9, 2015 to the Final Office Action mailed Aug. 24, 2015 from U.S. Appl. No. 13/828,820, 11 pages.
International Search Report and Written Opinion mailed Jun. 6, 2014 from PCT Patent Application No. PCT/2014/020949, 11 pages.
PCT Demand and Response to International Search Report & Written Opinion filed Oct. 6, 2014, rom PCT Patent Application No. PCT/2014/020949, 15 pages.
International Preliminary Report on Patentability mailed Feb. 10, 2015 from PCT Patent Application No. PCT/US2014/020949, 7 pages.
International Preliminary Report on Patentability mailed Jun. 4, 2015 from PCT Patent Application No. PCT/US2014/020951, 10 pages.
Non-Final Office Action mailed Aug. 15, 2014 from U.S. Appl. No. 13/828,622, 18 pages.
Response filed Dec. 15, 2014 to Non-Final Office Action mailed Aug. 15, 2014 from U.S. Appl. No. 13/828,622, 12 pages.
Final Office Action mailed Mar. 24, 2015 from U.S. Appl. No. 13/828,622, 18 pages.
Response filed Jun. 9, 2015 to Final Office Action mailed Mar. 24, 2015 from U.S. Appl. No. 13/828,622, 13 pages.
Non-Final Office Action mailed Aug. 13, 2015 from U.S. Appl. No. 13/828,622, 29 pages.
Applicant-Initiated Interview Summary mailed Nov. 30, 2015 from U.S. Appl. No. 13/828,622, 3 pages.
Response filed Dec. 9, 2015 to the Non-Final Office Action mailed Aug. 13, 2015 from U.S. Appl. No. 13/828,622, 12 pages.
International Search Report and Written Opinion mailed Jun. 10, 2014 from PCT Application No. PCT/US2014/020951, 12 pages.
Demand and Response filed Sep. 17, 2014 from PCT Patent Application No. PCT/US2014/020951,16 pages.
Written Opinion of the International Preliminary Examining Authority mailed Feb. 16, 2015 from PCT Patent Application No. PCT/US2014/020951, 5 pages.
International Preliminary Report mailed Dec. 31, 2014 from PCT Patent Application No. PCT/US2013/045284, 10 pages.
Voluntary Amendment filed Feb. 15, 2016 from China Patent Application No. 201480010128.4, 10 pages.
Non-Final Office Action mailed Jun. 10, 2016 from U.S. Appl. No. 13/564,727, 41 pages.
Voluntary Amendment filed Mar. 16, 2016 from China Patent Application No. 201480015162.0, 7 pages.
Voluntary Amendment filed Mar. 16, 2016 from China Patent Application No. 201480015444.0, 6 pages.

(56) References Cited

OTHER PUBLICATIONS

Final Office Action mailed Mar. 11, 2016 from U.S. Appl. No. 13/564,727, 53 pages.
Final Office Action mailed Mar. 11, 2016 from U.S. Appl. No. 13/828,622, 43 pages.
Second Office Action mailed Feb. 14, 2016 from China Patent Application No. 201310241494.8, 10 pages.
Non-Final Office Action mailed Jan. 6, 2015 from U.S. Appl. No. 13/564,727, 22 pages.
Response filed Jun. 4, 2015 to Non-Final Office Action mailed Jan. 6, 2015 from U.S. Appl. No. 13/564,727, 10 pages.
Final Office Action mailed Jun. 19, 2015 from U.S. Appl. No. 13/564,727, 28 pages.
Applicant Initiated Interview Summary mailed Sep. 17, 2015 from U.S. Appl. No. 13/564,727, 3 pages.
Response filed Sep. 22, 2015 to Final Office Action mailed Jun. 19, 2015 from U.S. Appl. No. 13/564,727, 11 pages.
Non-Final Office Action mailed Nov. 3, 2015 from U.S. Appl. No. 13/564,727, 25 pages.
Response filed Jan. 14, 2016 to Non-Final Office Action mailed Nov. 3, 2015 from U.S. Appl. No. 13/564,727, 11 pages.
International Search Report and Written Opinion mailed Sep. 18, 2013 from PCT Patent Application No. PCT/US2013/045284, 14 pages.
First Office Action and Search Report mailed Jun. 23, 2015 from China Patent Application No. 201310241494.8, 13 pages.
Response filed Sep. 24, 2015 to First Office Action mailed Jun. 23, 2015 from China Patent Application No. 201310241494.8, 9 pages.
Non-Final Office Action mailed Jun. 9, 2014 from U.S. Appl. No. 13/773,660, 12 pages.
Response filed Oct. 30, 2014 to Non-Final Office Action mailed Jun. 9, 2014 from U.S. Appl. No. 13/773,660, 10 pages.
Final Office Action mailed Jan. 27, 2015 from U.S. Appl. No. 13/773,660, 15 pages.
Response filed Apr. 28, 2015 to Final Office Action mailed Jan. 27, 2015 from U.S. Appl. No. 13/773,660, 11 pages.
Notice of Allowance mailed Aug. 28, 2015 from U.S. Appl. No. 13/773,660, 9 pages.
Supplemental Notice of Allowability mailed Sep. 25, 2015 from U.S. Appl. No. 13/773,660, 2 pages.
Notice of Allowance mailed Jan. 4, 2016 from U.S. Appl. No. 13/773,660, 20 pages.
International Search Report & Written Opinion mailed Sep. 8, 2014 from PCT Patent Application No. PCT/US2014/016747, 10 pages.
PCT Demand and Response mailed Dec. 22, 2014 from PCT Patent Application No. PCT/US2014/016747, 14 pages.
Written Opinion of the International Preliminary Examining Authority mailed Mar. 3, 2015 from PCT Patent Application No. PCT/US2014/016747, 8 pages.
International Preliminary Report on Patentability mailed May 29, 2015 from PCT Patent Application No. PCT/US2014/016747, 11 pages.
Intention to Grant mailed Feb. 15, 2016 from European Patent Application No. 14715154.2, 47 pages.
International Preliminary Report mailed Mar. 26, 2015 from PCT Patent Application No. PCT/US2013/058348, 8 pages.
Notice of Allowance mailed Sep. 9, 2016 from U.S. Appl. No. 13/564,727, 27 pages.
Response filed Sep. 27, 2016 to the Non-Final Office Action mailed May 5, 2016 from U.S. Appl. No. 13/828,820, 14 pages.
Response filed Oct. 24, 2016 to the Third Office Action mailed Aug. 29, 2016 from Chinese Patent Application No. 2013102414948, 10 pages.
Terminal Disclaimer and Response filed Oct. 25, 2016 to the Non-Final Office Action mailed Aug. 17, 2016 from U.S. Appl. No. 14/738,562, 11 pages.
Notice of Allowability mailed Oct. 14, 2016 from U.S. Appl. No. 13/564,727, 10 pages.
Response filed Aug. 10, 2016 to the Restriction Requirement mailed Jun. 24, 2016 from U.S. Appl. No. 14/738,562, 7 pages.
Non-Final Office Action mailed Aug. 17, 2016 from U.S. Appl. No. 14/738,562, 75 pages.
Response filed Aug. 30, 2016 to the Non-Final Office Action mailed Jun. 10, 2016 from U.S. Appl. No. 13/564,727, 15 pages.
Response filed Sep. 2, 2016 to the Final Office Action mailed Mar. 11, 2016 from U.S. Appl. No. 13/828,622, 16 pages.
Notice of Allowance mailed Dec. 22, 2016 from U.S. Appl. No. 14/738,562, 33 pages.
Final Office Action mailed Dec. 30, 2016 from U.S. Appl. No. 13/828,820, 67 pages.
Notice of Allowability mailed Nov. 9, 2016 from U.S. Appl. No. 13/564,727, 8 pages.
Notice of Allowability mailed Nov. 22, 2016 from U.S. Appl. No. 13/564,727, 6 pages.
Non-Final Office Action mailed Nov. 30, 2016 from U.S. Appl. No. 13/828,622, 62 pages.
Notification on Grant of Patent Right mailed Jan. 3, 2017 from Chinese Patent Application No. 201310241494.8, 5 pages.
Notice of Allowance mailed Feb. 21, 2017 from U.S. Appl. No. 14/738,562, 14 pages.
After Final Consideration Pilot Program Request and response filed Feb. 28, 2017 to the Final Office Action mailed Dec. 30, 2016 from U.S. Appl. No. 13/828,820, 15 pages.
Applicant-Initiated Interview Summary mailed Mar. 1, 2017 from U.S. Appl. No. 13/828,820, 3 pages.
Response filed Feb. 28, 2017 to the Non-Final Office Action mailed Nov. 30, 2016 from U.S. Appl. No. 13/828,622, 15 pages.
Advisory Action and After Final Consideration Pilot Program Decision mailed Mar. 13, 2017 from U.S. Appl. No. 13/828,820, 4 pages.
Applicant-Initiated Interview Summary mailed Mar. 3, 2017 from U.S. Appl. No. 13/828,622, 3 pages.
Applicant-Initiated Interview Summary mailed Mar. 29, 2017 from U.S. Appl. No. 13/828,622, 3 pages.

\* cited by examiner

US 9,681,367 B2

WHITE SPACE UTILIZATION

BACKGROUND

Ever increasing numbers of wireless devices are being introduced and sold. As such, the radio frequency (RF) spectrum available for these wireless devices to communicate continues to get more and more crowded. More efficient use of the RF spectrum and sharing under-utilized RF spectrum are very important to meet the growing number of wireless devices. One portion of the RF spectrum that is under-utilized is the portion reserved for broadcasting, such as television (TV) broadcasting. Governmental regulators divided the TV portion or range (and/or other portions) into a plurality of channels. However, for any given geographic region many of the channels are not utilized for TV or radio broadcasting.

Unused channels or frequencies of the reserved TV portion of the RF spectrum can be referred to as TV white space. It is possible to utilize these TV white spaces for other uses, however, their use tends to be tightly regulated by governmental institutions (such as the Federal Communications Commission in the United States).

These governmental institutions are establishing databases that map channel or frequency utilization to geographic location. Stated another way, for a given location, the database can indicate a sub-set of frequencies that are utilized (e.g., allocated) for TV broadcasting and other licensed use (such as wireless microphones in some countries) and/or a different sub-set of frequencies that are TV white spaces.

Wireless devices that would like to communicate data over a radio white space frequency, such as a TV white space frequency, have to do so in compliance with the rules established by the governmental institutions. For instance, the devices cannot transmit on allocated frequencies, since the transmission could interfere with the licensed use.

SUMMARY

The described implementations relate to radio white space utilization. As used herein, the term "radio white space" can include TV white space and/or any other radio white space. One example can obtain information about a location of a device. The example can access a white space database to obtain radio white space frequencies relative to the location. This example can also perform active scanning of at least some of the radio white space frequencies at the location and not perform active scanning on allocated frequencies.

Another example can include memory and a processor configured to execute instructions stored on the memory. This example can also include a communication component configured to obtain a set of location-specific radio white space frequencies provided by a regulatory database. The communication component can be further configured to scan individual radio white space frequencies to identify an available network.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio white space frequencies. More specifically the patent relates to the ability of devices to discover individual white space frequencies over which data communication can be accomplished. The device may want to perform active scanning of radio white space frequencies to identify one or more individual frequencies that are available for data communication.

As mentioned above, radio white space frequencies can include TV white space frequencies and/or other radio white space frequencies. As used herein a "TV white space frequency" means a frequency or frequency range that was reserved for TV broadcasting, but which is not actually used for TV broadcasting in a particular geographic region. Similarly, "radio white space frequency" means a frequency or frequency range that was reserved for TV broadcasting, for other radio broadcasting, or two way radio communications, but which is not actually used in such manner in a particular geographic region. Stated another way, radio white space can refer to allocated but unused spectrum.

SYSTEM EXAMPLES

Figure 1:
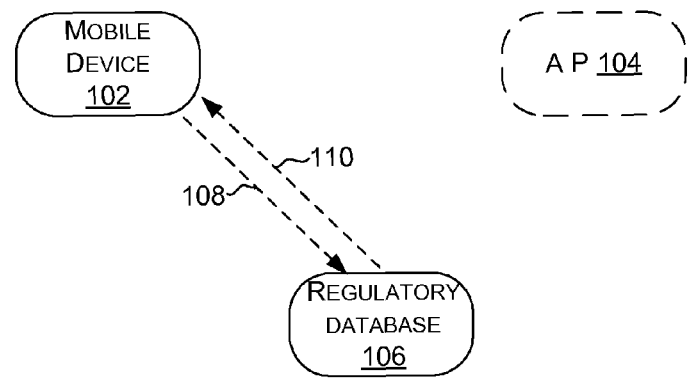
FIGS. 1-6 show examples of systems configured to utilize radio white space frequencies in accordance with some implementations of the present concepts.
Figure 1:
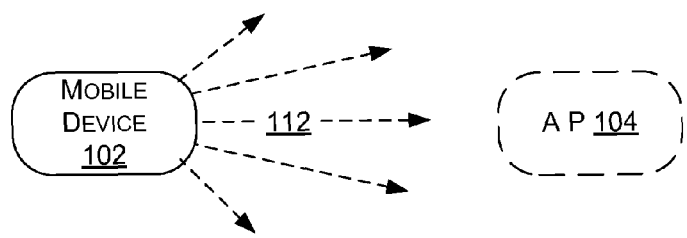
Figure 1:
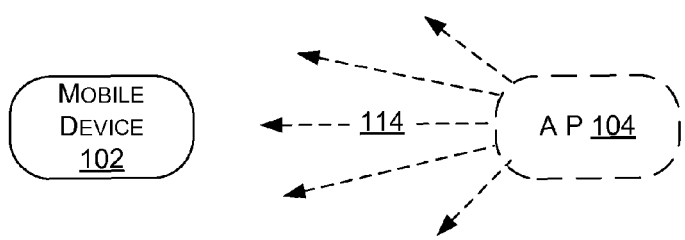
Figure 1:
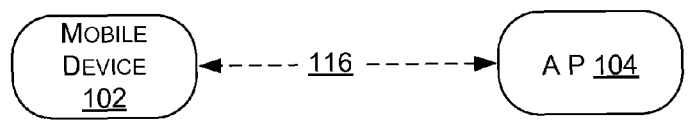

For purposes of explanation consider introductory FIG. 1, which shows a scenario involving a system 100 where utilization of radio white space frequencies can be accomplished.

In this case, system 100 includes a mobile device 102 and another device functioning as a wireless access point (AP) 104. System 100 also includes a regulatory web-site or database 106. Assume that mobile device 102 wants to communicate utilizing a radio white space frequency. Stated another way, the mobile device wants to find a network that is using a radio white space frequency. The mobile device can access the network to communicate data over the radio white space frequency. In some cases the mobile device may want to use a radio white space frequency because the radio white space frequency may offer cost and/or bandwidth advantages over other radio frequencies available to the mobile device.

Briefly, assume that the AP 104 queried the regulatory database 106 with its (the AP's) location. The regulatory database can provide a set of available radio white space frequencies and a set of associated constraints, such as duration of use and power of use. The AP can then use one or more of the available radio white space frequencies consistent with the constraints (e.g., establish a network on an individual available radio white space frequency).

In Instance 1, the mobile device 102 would like to identify one or more available radio white space frequencies that it can use for data communication. Stated another way, the mobile device can look for one or more networks utilizing radio white space frequencies that it can join. Other frequencies available to the mobile device may be crowded, offer lesser bandwidth than radio white space frequencies, and/or may be associated with a fee structure that incurs additional cost for the use. (At this point, the mobile device may be unaware of the AP 104 (at least relative to the radio white space frequencies) as indicated by the dashed or 'ghost' lines used to depict the AP). The mobile device can identify individual radio white space frequencies through passive scanning of frequencies in a range of the radio spectrum, such as the TV spectrum. (This example is explained relative to the TV range of the spectrum, but also applied to other ranges of the radio spectrum that have white spaces).

Passive scanning can be characterized as listening for broadcasts on individual frequencies to infer what radio white spaces are available for use. However, passive scanning tends to be relatively energy intensive and relatively time consuming compared to active scanning. This can be especially problematic if the mobile device is operating on battery power.

Active scanning can reduce power and/or time to discover available frequencies compared to passive scanning. In active scanning the mobile device 102 actively pings for available frequencies, such as with a probe request. However, at this point, the mobile device 102 cannot perform active scanning on the TV spectrum since that would entail transmitting on allocated TV frequencies. Recall that at a given location some of the frequencies in this range are allocated and others are not. Recall further that at this point the mobile device 102 does not know which frequencies are allocated at its location. Stated another way, the mobile device does not know which frequencies within the TV spectrum it is allowed to transmit on (e.g., white space frequencies) and which other frequencies within the TV spectrum (e.g., allocated frequencies) that it is not allowed to transmit on for interference reasons).

At Instance 1, the mobile device 102 can determine its location and query the regulatory database 106 as indicated at 108. The mobile device can query the regulatory database using any available interface (specific examples are described below relative to FIGS. 2-5). The regulatory database can return a set of available TV white space frequencies based upon the location (and other user constraints) at 110. As mentioned above, while this example relates to TV white space frequencies, the present concepts can be applied to other radio white space frequencies.

Instance 2 shows the mobile device 102 performing active scanning (e.g., sending a probe request) 112 on an individual radio white space frequency obtained from the regulatory database in Instance 1. The probe request may be addressed to any network or a specific network. The mobile device can perform the active scanning for multiple individual radio white space frequencies in search of a response. The active scanning of the multiple individual radio white space frequencies can be performed in a parallel or serial manner.

Instance 3 shows the AP 104 sending a response (e.g., probe response) 114 relative to the individual radio white space frequency. The response can be received by the mobile device 102.

Instance 4 shows the mobile device 102 and the AP 104 upon completion of the association and authentication process that begins with the probe request and probe response described above. Completion of the process can allow the mobile device to use a network established by the AP on the individual radio white space frequency. Note that the AP 104 is now shown with solid lines to indicate that it has been discovered by the mobile device 102. At this point mobile device 102 can accomplish the data communication over the individual radio white space frequency with AP 104 as indicated at 116.

FIGS. 2-5 illustrate systems for implementing the concepts introduced relative to FIG. 1 as well as additional concepts.

Figure 2:
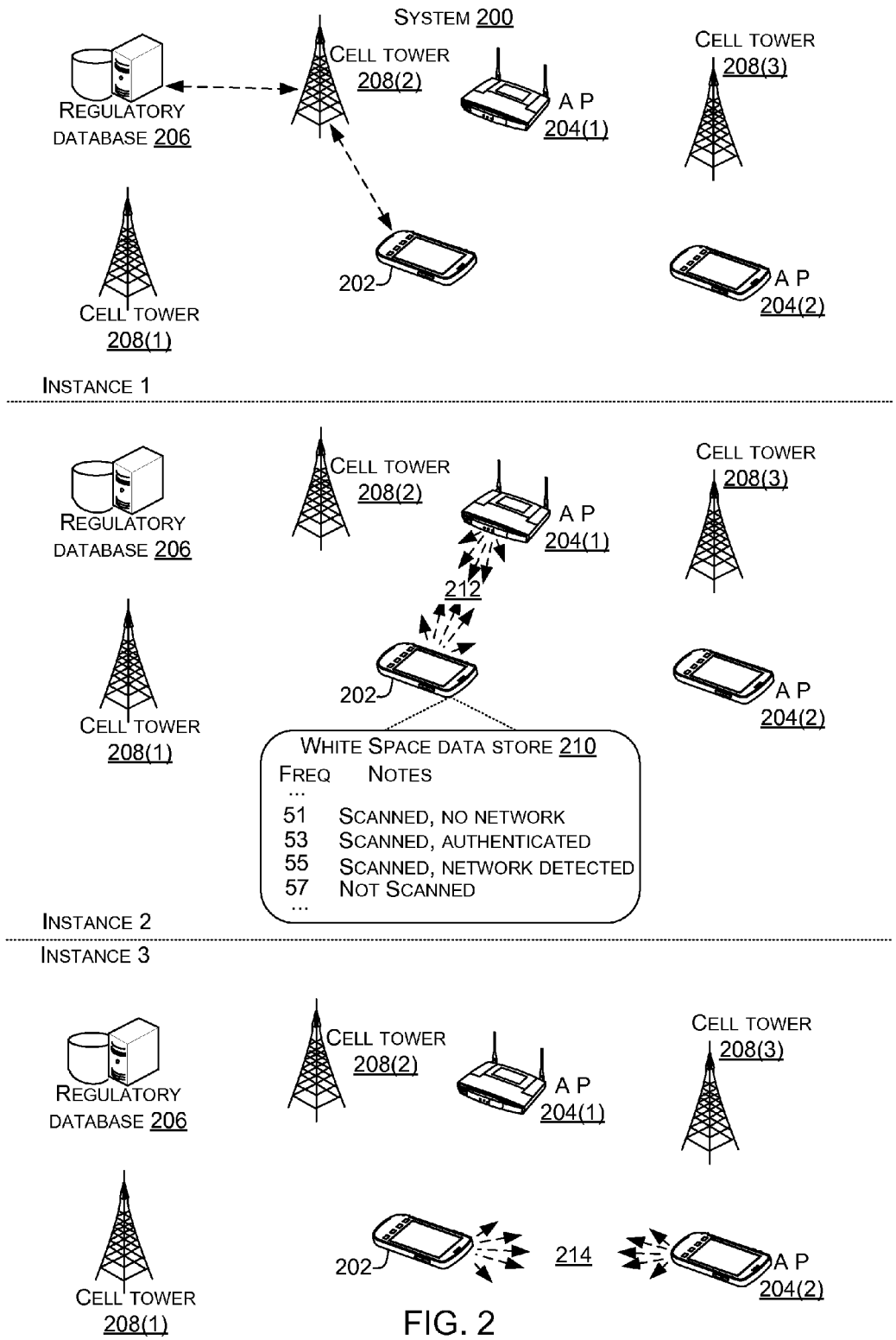
Figure 3:
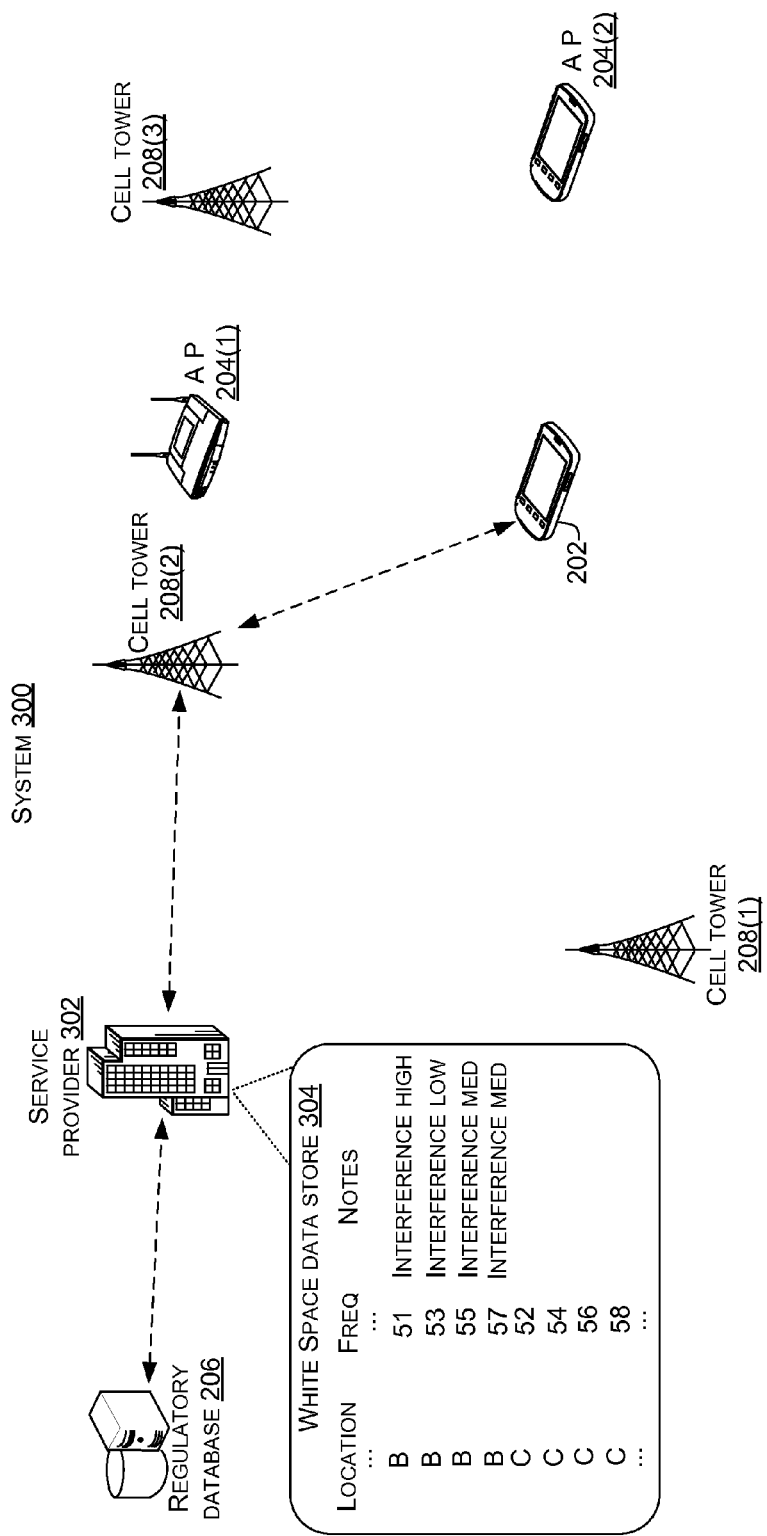

FIG. 2 shows a mobile device 202, two APs 204(1) and 204(2), regulatory database 206, and three cell towers 208(1), 208(2), and 208(3) associated with a cellular service provider (shown FIG. 3).

At instance 1, assume that the mobile device 202 wants to use radio white space frequencies. The mobile device can determine its location, such as with GPS technologies or cell tower triangulation. The mobile device can query the regulatory database 206 with the location data. In this case, the mobile device can query the regulatory database utilizing data channels of cellular technology (e.g., 3G, 4G, 4G-LTE, etc.) through the cell towers 208. The regulatory database can provide a set of radio white space frequencies for the mobile device's location.

At instance 2 the mobile device 202 has stored the set of radio white space frequencies in a white space data store 210. Rows of the white space data store map individual frequencies to information or notes about the individual frequencies. For purposes of explanation, four rows are illustrated relating to white space frequencies (or channels) 51, 53, 55, and 57, respectively. The notes for white space frequency 51 indicate that active scanning has been performed (e.g., "scanned") and that no network was detected. Similarly, scanning was performed on white space frequency 53, a network was detected and authenticated. White space frequency 55 has also been scanned, and a network detected, but authentication has not been performed. Finally, white space frequency 57 has not yet been scanned.

Assume for purposes of explanation, that the network detected relative to white space frequency 53 is provided by AP 204(1) and thus the authentication occurred between mobile device 202 and AP 204(1) so that data can be communicated over white space frequency 53 as indicated at 212.

The white space data store 210 can be useful for many scenarios, such as when the mobile device 202 encounters a change in conditions or an expected change in conditions. For example, the conditions can relate to time or location, among others. For instance, AP 204(1)'s conditional use of white space frequency 53 may expire. As such, this frequency and the associated network provided by AP 204(1) may become unavailable to the mobile device. In this case, the white space data store 210 can allow the mobile device to seamlessly transition to another radio white space frequency. For example, with the loss of white space frequency 53, the mobile device could authenticate on detected radio white space frequency 55 to begin using that frequency instead.

Further, some implementations may perform passive scanning or otherwise detect use of an individual radio white space frequency. This detected use can be noted in the white space data store 210. In the event that the mobile device 202 decides to actively scan additional radio white space frequencies from the set of radio white space frequencies, the mobile device can begin with the frequencies that activity has been noted. This configuration can save on active scanning costs (e.g., power and/or time) compared to randomly scanning frequencies from the set since frequencies with no activity are less likely to be utilized on a network.

Instance 3 shows mobile device 202 communicating over radio white space frequency 55 via AP 204(2) as indicated at 214. The transition from radio white space frequency 53 to radio white space frequency 55 can be achieved without requiring additional access to the regulatory database 206. In still another example of a change in conditions, the mobile device may move (e.g., be moved by the user). Accordingly, the mobile device may be required to re-query the regulatory database 206 with its new location. (For instance, if the user moves the mobile device farther than a location accuracy required by the regulatory database, the mobile device may re-query with the new location). For example, if the regulatory database requires location accuracy to be plus or minus 100 meters and the mobile device moves 10 feet, then a new query may not be required. In contrast, if the mobile device moves 200 meters, then a new query can be made).

However, in either case, there is likely to be overlap between the white space frequencies provided for the new location and the old location. As such, the information about individual white space frequencies and whether data can be communicated over those frequencies can reduce the amount of active scanning that the mobile device 202 does before utilizing one of the radio white space frequencies for data communication. Note also, that of course, the white space data store 210 can be dynamic. For instance, if communication over white space frequency 53 is lost, the white space data store can be updated to reflect the change. In a similar fashion if additional radio white space frequencies of the set are scanned, the results can be added to the white space data store. Further, for sake of brevity, the illustrated notes relating to each frequency are quite short. However, greater detail can be included in the notes. For instance, interference levels, signal strength, and/or signal quality, among others, can be noted.

FIG. 3 shows an alternative system 300. Elements from system 200 are retained and are not re-introduced. This implementation offers an alternative to utilizing cellular 3G, 4G, or 4G-LTE data channel technologies described above relative to FIG. 2. This implementation can allow the mobile device 202 to query information maintained by the regulatory database 206 independent of whether the mobile device has a data plan for cellular service. In this case, the mobile device 202 can utilize an SMS stack protocol (e.g., cell control channel) to communicate with an intermediary. The mobile device can provide its location in an SMS communication along with a request to access the regulatory database. (Alternatively, the intermediary may already know the location of the mobile device). The intermediary can obtain white space frequency information from the regulatory database relative to the location. The intermediary can communicate the white space frequency information to the mobile device utilizing the SMS communication.

In this particular case, the intermediary can be the cell service provider 302. The cell service provider 302 may receive the mobile device's query for the regulatory database 206 for available radio white space frequencies. The cell service provider can obtain the information from the regulatory database and communicate the information to the mobile device 202. Note also, that rather than the communication being instigated by the mobile device 202, the communication could be instigated by the cell service provider 302. For instance, the cell service provider may detect that its cell towers proximate to the mobile device are operating at or near capacity. The cell service provider could send a list of radio white space frequencies for the mobile device's location and instruct the mobile device to try to communicate data over one of the radio white space frequencies rather than the cell data channel.

FIG. 3 introduces another inventive aspect relating to an alternative configuration where the cell service provider 302 can maintain a white space data store 304 based upon information from the regulatory database 206. The white space data store 304 can be populated with information from the regulatory database 206 that maps locations to radio white space frequencies. The white space data store 304 can include all of the information from the regulatory database or the white space data store can include a sub-set of the information from the regulatory database. For example, the white space data store may obtain the information from the regulatory database relating to locations for which the cell service provider provides service but not those locations for which it does not provide service.

The white space data store 304 can be periodically synchronized to the regulatory database 206. In some cases, the cell service provider 302 may send the same information to the mobile device 202 as would be obtained by querying the regulatory database directly. In other cases, the cell service provider 302 may augment the information. For purposes of explanation, assume that the mobile device is at hypothetical location "B".

In the present case, the radio white space frequencies identified by the regulatory database 206 for location B are 51, 53, 55, and 57. Further, feedback obtained by the service provider 302 indicates that interference of frequency 51 is high, frequency 53 is low, and frequencies 55 and 57 are medium. Thus, the service provider may return frequencies 51, 53, 55, and 57 to the mobile device 202 along with a recommendation to try frequency 53 first, then frequencies 55 and 57, followed by 51. In this way, the service provider can potentially enhance the results obtained by mobile device 202 and/or decrease the time and energy involved to identify a frequency that provides satisfactory data communication. Note that the mobile device can also maintain its own white space data store 210 (FIG. 2). The mobile device can then contribute to the interference data of white space data store 304 by providing its feedback to the service provider 302.

Figure 4:
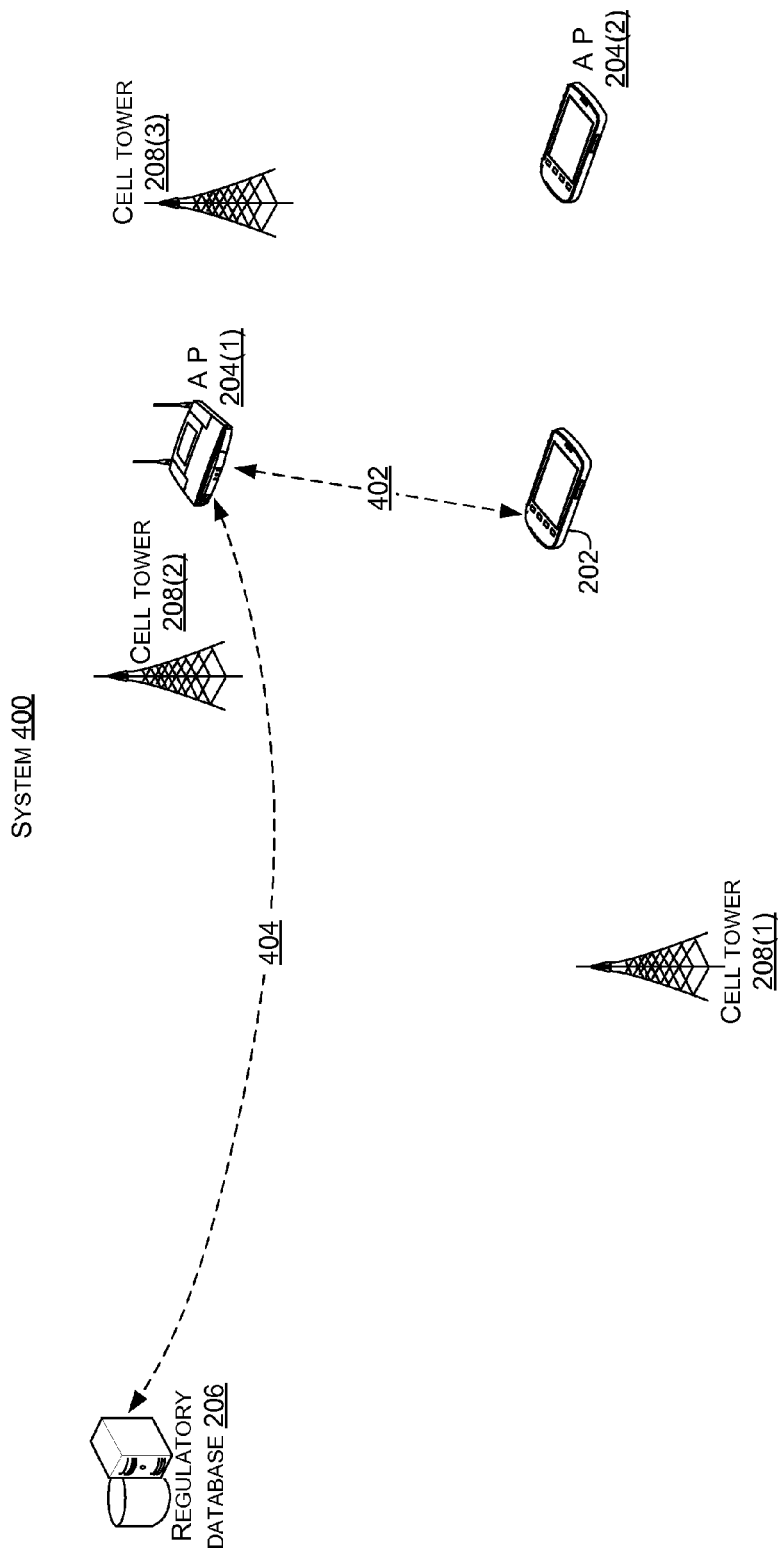

FIG. 4 shows another alternative system 400. In this case, the mobile device 202 can access the regulatory database 206 utilizing a communication technology other than cellular technologies. The communication technology can be any wired or wireless technology (or combination of technologies) that can allow the mobile device to communicate with the regulatory database or otherwise obtain information from a secondary source that relates to information from the regulatory database. In this example, the mobile device uses a wireless technology, such as Wi-Fi or Bluetooth, such as with AP 204(1) or other device to access the Internet as indicated at 402. The mobile device can utilize the Internet to access the regulatory database 206 to obtain a set of radio white space frequencies for the mobile device's location as indicated at 404.

The mobile device 202 can then perform active scanning on the set of radio white space frequencies but avoid scanning on other frequencies (e.g., frequencies that are allocated at the mobile device's location). The mobile device 202 may detect a network on one or more of the actively scanned radio white space frequencies. For instance, the mobile device may detect and authenticate to a network provided by AP 204(1) or AP 204(2), among others. Thus, the detected networks using available radio white space frequencies may or may not be associated with devices (such as AP 204(1)) that helped the mobile device access the regulatory database 206.

Figure 5:
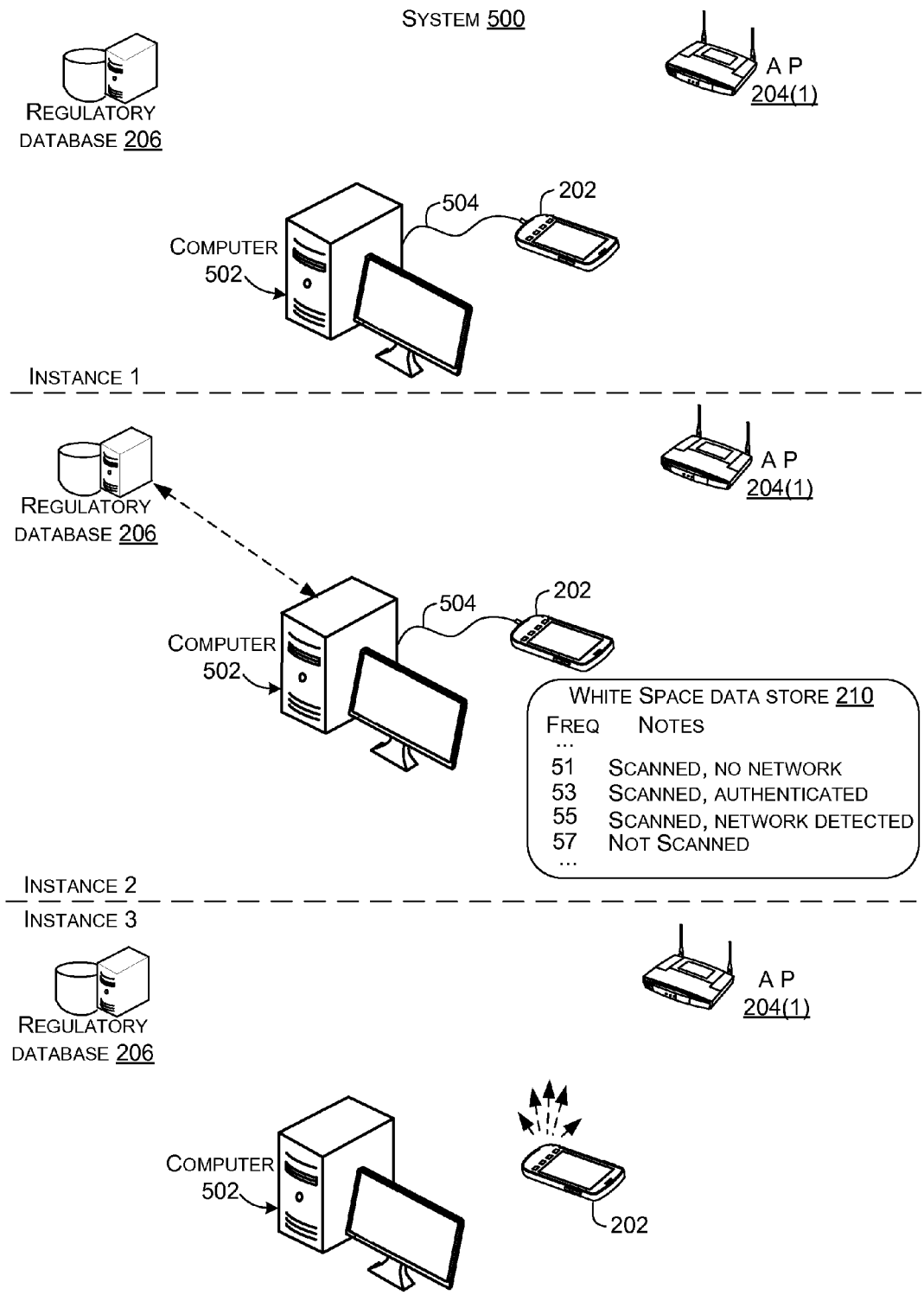

FIG. 5 shows another alternative system 500 that retains some of the elements introduced above and introduces a computer 502 in the form of a desktop computer. In this case, at Instance 1, the mobile device 202 is connected to the desktop computer 502 by a cable 504. For instance, the cable 504 may be a USB cable, among others. The mobile device 502 may be connected to the computer to recharge its battery, among other reasons.

At Instance 2 the mobile device 202 can access the Internet and ultimately the regulatory database 206 via the cable 504 and computer 502. The mobile device can supply location information (e.g., its location) to the regulatory database and obtain a set of radio white space frequencies. In this example, the set of radio white space frequencies can be stored in data store 210.

Further, the mobile device 202 could perform passive scanning and/or active scanning on the set. While passive scanning can be utilized on the set in any scenario, a cost benefit analysis of whether to perform passive scanning may be favorable in this case since the mobile device is obtaining power from the computer 502. As such, power consumption may be weighted lower in importance than in situations where the mobile device is relying on battery power. In Instance 2, the active and/or passive scanning can be performed even though the mobile device 202 presently has 'wired' access to the Internet and as such the mobile device may not utilize any of the scanned radio white space frequencies. Instead, the results of the scanning can be stored in the white space data store 210 until the mobile device experiences a change in conditions.

Instance 3 shows one such possible change in conditions. In this case, the change in conditions involves the user disconnecting the mobile device 202 from the computer 502. Now, the mobile device may want to utilize radio white space frequencies for data communication. As such, the mobile device can utilize the notes in the white space data store 210 to select individual frequencies for use. For instance, the mobile device can immediately start using frequency 53. In another configuration, the mobile device may recheck (e.g., scan, associate and/or authenticate) the network on frequency 53 before commencing use. In either case, the mobile device can start using radio white space frequencies quicker and/or with less power consumption than a scenario where the mobile device did not access the regulatory database until it desired to use a radio white space frequency.

Figure 6:
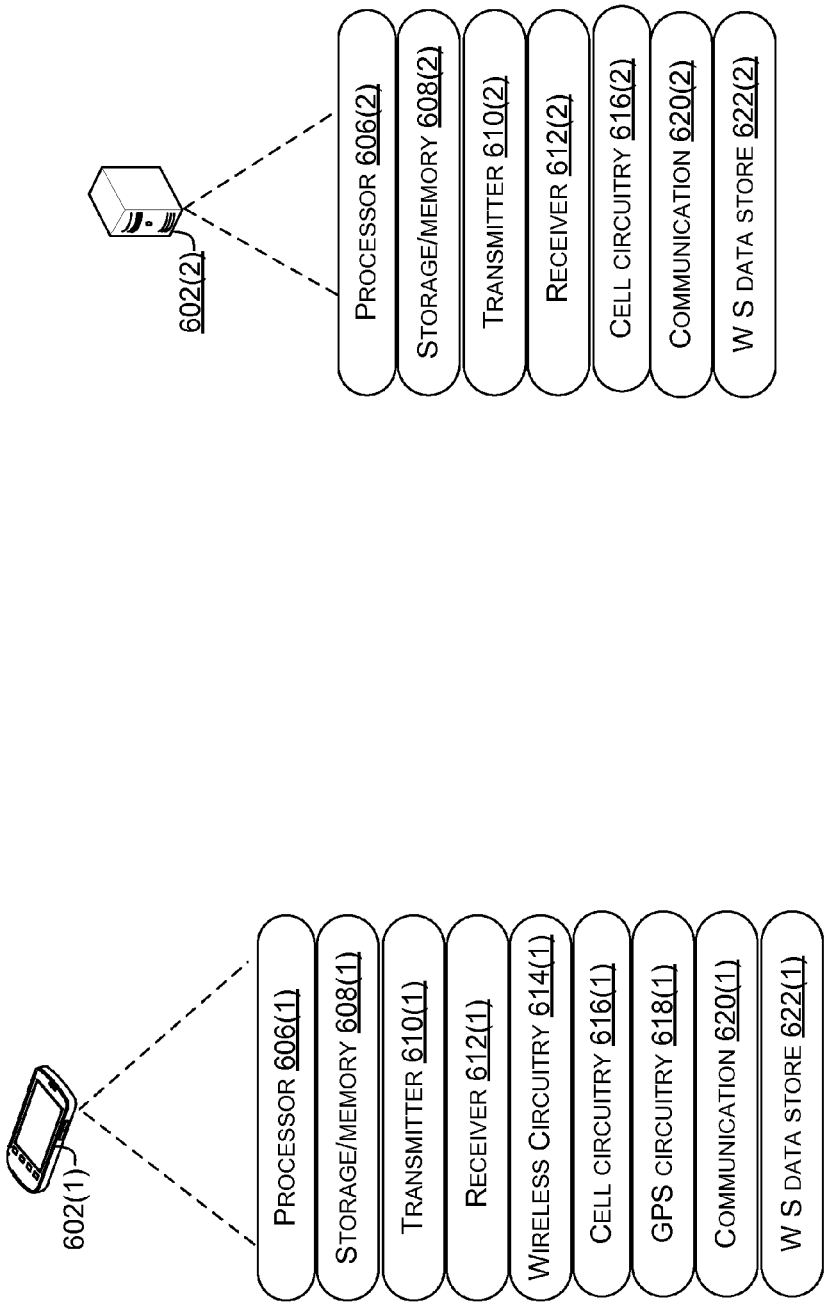

FIG. 6 shows system 600 that can enable the selective active scanning concepts described above. Further, system 600 can include multiple devices 602 that can be similar to the devices described above. For example, device 602(1) can be similar to mobile device 202. Further, device 602(2) can be employed by service provider 302 (FIG. 3). (In this discussion, the use of a designator with the suffix, such as "(1)", is intended to refer to a specific device instance. In contrast, use of the designator without a suffix is intended to be generic). Of course, not all device implementations can be illustrated and other device implementations should be apparent to the skilled artisan from the description above and below.

Devices 602 can include several elements which are defined below. For example, these devices can include a processor 606, storage/memory 608. The devices can also include (or be communicatively coupled with) a transmitter 610, a receiver 612, wireless circuitry 614, cell circuitry 616, GPS circuitry 618, a communication component 620, and/or a data store 622. The devices can alternatively or additionally include other elements, such as input/output devices (e.g., touch, voice, and/or gesture), buses, graphics cards, etc., which are not illustrated or discussed here for sake of brevity.

The term "device", "computer", or "computing device" as used herein can mean any type of device that has some amount of processing capability and/or storage capability. Processing capability can be provided by one or more processors (such as processor 606) that can execute data in the form of computer-readable instructions to provide a functionality. Data, such as computer-readable instructions, can be stored on storage, such as storage/memory 608 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as personal computers, desktop computers, notebook computers, cell phones, smart phones, personal digital assistants, pad type computers, mobile computers, cameras, or any of a myriad of ever-evolving or yet to be developed types of computing devices. A mobile computer can be any type of computing device that is readily transported by a user and may have a self-contained power source (e.g., battery).

In the illustrated implementation, devices 602 are configured with a general purpose processor 606 and storage/memory 608. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the communication component 620 can be installed as hardware, firmware, or software during manufacture of the device 602 or by an intermediary that prepares the device for sale to the end user. In other instances, the end user may install the communication component 620, such as in the form of a downloadable application.

The transmitter 610 and the receiver 612 can function to transmit and receive data at various frequencies. For example, the transmitter 610 and the receiver 612 can be configured to operate at specific frequencies, such as 2.4 Giga Hertz frequency, 5.0 Giga Hertz frequency, 60 Giga Hertz frequency, radio frequencies, and/or TV channel frequencies (50 Mega Hertz to 810 Mega Hertz), among others. Alternatively, the transmitters and receivers can be configured to tune to any frequencies in the RF spectrum. While discrete components or elements are illustrated, some implementations may combine elements. For instance, wireless circuitry 614 may include dedicated transmitters and receivers rather than interfacing with distinct transmitters and receivers.

Relative to device 602(1), the communication component 620(1) can utilize the GPS circuitry 618(1) to determine its location. Alternatively or additionally to GPS location identification, the communication component can cause triangulation (such as cell tower triangulation or Wi-Fi access point triangulation) to be performed to determine its location. The communication component can identify an interface to access the regulatory database 206 (FIG. 2) with the location information. For instance, the communication component can access the Internet and utilize a uniform resource identifier (URI) of the regulatory database to obtain a set of location specific radio white space frequencies. The communication component can then store the set of location specific radio white space frequencies in the white space data store 622(1).

The communication component 620(1) can track individual frequencies and/or interfaces, such as Bluetooth frequencies, Wi-Fi frequencies, radio white space frequencies, and cell service, among others that are available to the device 602(1) and store the information along with any respective notes in the white space data store 622(1). The communication component can select individual frequencies or services for use by the device 602(1). The communication component can then cause the transmitter 610(1), receiver 612(1), wireless circuitry 614, and/or cell circuitry 616(1) to facilitate communication over the selected frequency/service. In this way, the communication component 620(1) can provide a connection manager functionality and can cause the frequencies/services to be cached in the white space data store 622(1).

Relative to device 602(2), the communication component 620(2) can obtain location specific radio white space frequency data from regulatory database 206 (FIG. 2). The communication component can store the location specific radio white space frequency data in the white space data store 622(2). The communication component can store additional information in the white space data store (examples are noted above relative to FIG. 3). In some configurations, the communication component can track mobile devices associated with the service provider and correlate the location of individual devices with locations from the regulatory databases. In other configurations, the communication component can receive a request for location specific radio white space frequencies from an individual device, such as device 602(1) and obtain the available radio white spaces from the white space data store or from the regulatory database on behalf of the device.

Communication component 620(2) can also receive feedback from individual devices, such as device 602(1) and store the feedback in the white spaces data store 622(2). The feedback information can be utilized by the communication component to make recommendations to the mobile devices regarding selection of one radio white space frequency over another (such as based upon levels of interference at or proximate to the device's location).

Further, in some cases, the communication component 620(2) can track usage of individual resources and make recommendations to mobile devices based upon the tracked usage. For instance, the communication component may monitor data usage by the mobile device utilizing a specific technology, such as a cell data plan. In an instance where the rate of use and/or total use is high such that the device may exceed its data plan and incur additional expenses, the communication component 620(2) may suggest that the mobile device switch to a radio white space frequency and may even suggest a specific frequency based upon the mobile device's location and feedback from (or proximate to) the location.

In other cases, the communication component 620(2) may consider the resources of the service provider. For example, in an instance where a cell tower or other resource servicing device 602(1) is operating above a threshold value, the communication component 620(2) may suggest to the communication component 620(1) of the device to conduct some or all of its data communication over a radio white space frequency. The communication component 620(2) may even offer an incentive to the communication component 620(1) to make such a switch. For example, if the mobile device switches for a period of time from using the cell resources to radio white space resources, the communication component 620(2) may give a cash or data credit for future use on the device's data plan. Thus, the communication component 620(2) can reduce congestion on the service provider's resources (e.g., cell towers, satellites, etc.) by causing some of the devices using the congested resources to switch to utilizing radio white space networks.

METHOD EXAMPLES

Figure 7:
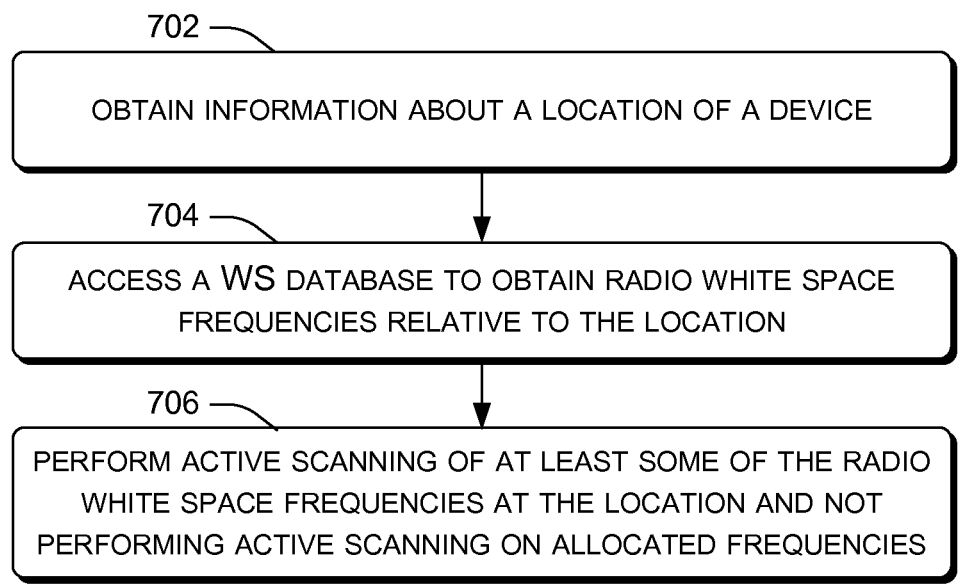
FIGS. 7-8 are flowcharts of examples of radio white space frequency utilization techniques in accordance with some implementations of the present concepts.

FIG. 7 shows a method 700 for utilization of radio white space frequencies.

The method can obtain information about a location of a device at 702.

The method can also access a radio white spaces (WS) database to obtain radio white space frequencies relative to the location at 704. The radio white space frequencies can be stored on the device, such as on a white spaces data store. The accessing can be accomplished over a wireless connection or over a wired connection. For example, the wireless connection can be a cellular data network (e.g., channels utilized with a data plan). In an alternative example, the accessing can be accomplished over a cellular control channel.

In some cases, the accessing can be accomplished by directly accessing a radio white spaces regulatory database. In other cases, the accessing can be accomplished by accessing an intermediary that has a copy of at least a portion of the radio white spaces regulatory database. For instance, the intermediary can be a cellular service provider.

The method can perform active scanning of at least some of the radio white space frequencies at the location and not perform active scanning on allocated frequencies at 706. Networks detected by the active scanning can be utilized to communicate data over an individual radio white space frequency.

Figure 8:
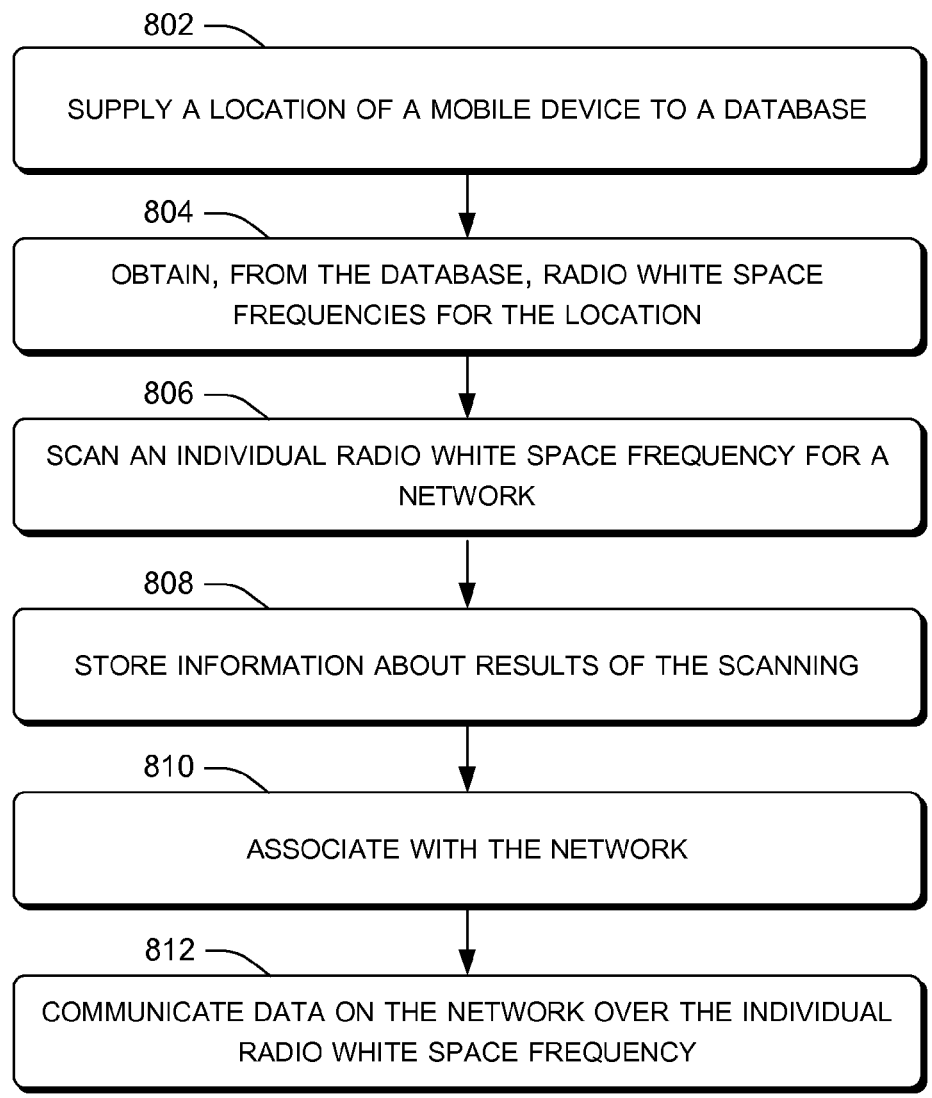

FIG. 8 shows a method 800 for utilization of radio white space frequencies.

The method can supply a location of a mobile device to a database at 802. In some cases, the supplying can include determining the location using GPS technologies. In another case, the supplying can include determining the location using triangulation to other devices that are communicatively coupled to the mobile device. For instance, cell tower triangulation can be utilized. Triangulation can provide accurate results, especially if the other devices are spaced apart from one another relative to the mobile device, rather than clustered. For instance, a spacing of at least 20 degrees between each device relative to the mobile device can provide accurate results.

In some cases, the regulatory database can be contacted directly. In other cases, an entity such as an intermediary like a cell service provider, can query the regulatory database on behalf of the mobile device. Further still, the intermediary can maintain another database that is populated with information from the regulatory database. The device can access the intermediary's database rather than the regulatory database.

The method can obtain from the database, radio white space frequencies for the location at 804. In some cases, the obtaining can include obtaining the radio white space frequencies of a frequency range (such as the TV range) that includes the radio white space frequencies and allocated frequencies.

The method can scan an individual radio white space frequency for a network at 806. In some cases the scanning is active scanning. In other cases, the scanning can entail passive scanning or a combination of passive scanning and active scanning. The scanning can entail scanning multiple frequencies of the radio white space frequencies and not scanning the allocated frequencies of the frequency range. Stated another way, the method can avoid scanning the allocated frequencies and thus avoid interfering with licensed broadcasts. In some cases, the individual radio white space frequency can be scanned for activity (e.g., the presence of a network) and then another individual radio white space frequency can be scanned (if desired). In other configurations, multiple individual radio white space frequencies can be scanned for networks simultaneously.

The method can store information about results of the scanning at 808. For instance, the method can send the information about the scanning to a database. Stated another way, results of the scanning can be saved in the database. The database can map the scanning information to individual respective radio white space frequencies. The database may occur on the device that performed the scanning (e.g., white space data store 622(1)) of FIG. 6)). In another configuration the database may occur on another device (e.g., white space data store 622(2)). In still other configurations, the information may be stored on a database on the device that performed the scanning and may also be sent to another remote database.

The method can associate with the network at 810. The associating can include various identification and security measures established to protect network devices and to ensure the network use complies with use constraints imposed by the regulatory database.

The method can communicate data on the network over the individual radio white space frequency at 812. As mentioned above, use of the radio white space frequency may have cost, bandwidth, and/or other potential advantages over other using other frequencies or interfaces, such as cell data channels. Note that the method may scan multiple radio white space frequencies for networks. While a single frequency/network may be selected for use, information about the other radio white space frequencies and any detected networks can be stored for future use should conditions change. Further, the scanning does not need to be a one time affair or stop when a suitable network is identified. Instead, the scanning can be ongoing (either continuously, periodically, or from time to time) so that an 'understanding' of the radio white space environment of the device is obtained. This 'understanding' can allow the device to relatively quickly find and/or switch to another network if conditions change. For instance, if the selected (e.g. associated) network is lost or interference becomes problematic the 'understanding' can allow the device to use the stored information to select an alternative (radio white space frequency) network much more quickly than if the device had to start the entire process all over again when the selected network is lost or becomes problematic.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio white space frequencies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:
1. A system, comprising:
a white space data store;
a processing device; and
a storage device storing computer-executable instructions which, when executed by the processing device, cause the processing device to:
obtain information about a location of a mobile device;
determine a current operating capacity of at least one cell tower proximate the mobile device;
access the white space data store to obtain a list of radio white space frequencies relative to the location;
send the obtained list of the radio white space frequencies to the mobile device over a cellular network; and,
based at least in part on the current operating capacity of the at least one cell tower, instruct the mobile device to perform active scanning of at least some of the radio white space frequencies from the list to discover a wireless access point at the location, the wireless access point providing a radio white space network on an individual radio white space frequency.

2. The system of claim 1, wherein the computer-executable instructions further cause the processing device to populate the white space data store with information from a regulatory database that maps locations to radio white space frequencies.

3. The system of claim 2, wherein the computer-executable instructions further cause the processing device to periodically synchronize the white space data store with the regulatory database.

4. The system of claim 1, wherein the system relates to a cell service provider.

5. The system of claim 4, wherein the computer-executable instructions further cause the processing device to populate the white space data store with information from a regulatory database relating to locations for which the cell service provider provides service.

6. The system of claim 1, wherein the computer-executable instructions further cause the processing device to instruct the mobile device to switch at least some data communication to the radio white space network from the cellular network.

7. The system of claim 1, wherein the computer-executable instructions further cause the processing device to instruct the mobile device to perform active scanning of a particular radio white space frequency from the list before performing active scanning of other radio white space frequencies from the list.

8. The system of claim 1, wherein the computer-executable instructions further cause the processing device to obtain interference data from the mobile device for the radio white space network and add the interference data to the white space data store.

9. A system comprising:
a white space data store;
a processing device; and
a communication component configured to execute on the processing device, the communication component being configured to:
obtain information about a location of a mobile device;
access the white space data store to obtain a list of radio white space frequencies for the location of the mobile device;
determine that a cell service provider is at or near capacity; and
responsive to the cell service provider being at or near capacity, cause the mobile device to scan multiple radio white space frequencies from the list to identify an individual white space frequency for data communication instead of using the cell service provider for the data communication.

10. The system of claim 9, the communication component being configured to:
determine that the cell service provider is at or near capacity based at least on a cell tower that is proximate the location of the mobile device.

11. The system of claim 10, further comprising the cell tower.

12. The system of claim 9, wherein the communication component is configured to:
cause the mobile device to perform active scanning of the multiple radio white space frequencies from the list.

13. A method comprising:
obtaining a location of a mobile device;
making a determination that at least one cell tower proximate the mobile device is currently operating at or near capacity;
obtaining a list of radio white space frequencies available at the location of the mobile device;
sending the obtained list of the radio white space frequencies to the mobile device; and
based at least in part on the determination that the at least one cell tower proximate the mobile device is currently operating at or near capacity, instructing the mobile device to perform active scanning of at least some of the radio white space frequencies from the list to discover a wireless access point at the location.

14. The method of claim 13, the obtaining the location comprising receiving the location from the mobile device.

15. The method of claim 13, the sending and instructing being performed using cellular data communication.

16. The method of claim 15, performed by a cellular service provider.

17. The method of claim 16, further comprising:
populating a white space data store maintained by the cellular service provider with white space authorizations provided by a regulatory database; and
obtaining the list of radio white space frequencies from the white space data store.

18. The method of claim 17, the populating being performed for areas where the cellular service provider provides service but not for other areas where the cellular service provider does not provide service.

19. The method of claim 17, further comprising:
obtaining feedback indicating interference on different white space frequencies;
incorporating the feedback into the white space data store; and
recommending specific white space frequencies to the mobile device based at least on corresponding levels of interference of certain white space frequencies that are available at the location of the mobile device.

20. The method of claim 19, further comprising:
receiving further feedback relating to an individual recommended white space frequency used by the mobile device; and
incorporating the further feedback into the white space data store.

* * * * *